United States Patent
Vella

(10) Patent No.: US 10,605,139 B2
(45) Date of Patent: Mar. 31, 2020

(54) CATALYTIC CONVERTER FOR CLASSIC CARS

(71) Applicant: AM GROUP REDBACK AB, Bankeryd (SE)

(72) Inventor: John Vella, Jönköping (SE)

(73) Assignee: AM GROUP REDBACK AB, Bankeryd (SE)

( * ) Notice: Subject to any disclaimer, the term of this patent is extended or adjusted under 35 U.S.C. 154(b) by 0 days.

(21) Appl. No.: 16/246,887

(22) Filed: Jan. 14, 2019

(65) Prior Publication Data

US 2019/0218952 A1 Jul. 18, 2019

(30) Foreign Application Priority Data

Jan. 15, 2018 (EP) ..................................... 18151654

(51) Int. Cl.
*F01N 3/28* (2006.01)

(52) U.S. Cl.
CPC ........... *F01N 3/2803* (2013.01); *F01N 3/281* (2013.01); *F01N 2260/06* (2013.01); *F01N 2330/02* (2013.01); *F01N 2330/30* (2013.01); *F01N 2330/32* (2013.01); *F01N 2370/00* (2013.01); *F01N 2370/02* (2013.01); *F01N 2450/40* (2013.01); *F01N 2470/20* (2013.01)

(58) Field of Classification Search
CPC .... F01N 3/2803; F01N 2339/32; F01N 3/281; F01N 2330/02; F01N 2330/30
USPC .................................................. 422/177, 180
See application file for complete search history.

(56) References Cited

U.S. PATENT DOCUMENTS

| 4,929,429 | A | * | 5/1990 | Merry | ................... | F01N 3/2857 |
| | | | | | | 422/179 |
| 6,087,298 | A | * | 7/2000 | Sung | ................... | B01D 53/945 |
| | | | | | | 502/333 |
| 6,312,650 | B1 | * | 11/2001 | Frederiksen | ....... | B01D 53/9431 |
| | | | | | | 181/264 |

(Continued)

FOREIGN PATENT DOCUMENTS

EP 2233197 A2 9/2010
FR 2460709 A1 1/1981

(Continued)

OTHER PUBLICATIONS

European Search Report for European Application No. 18151654.3, dated Aug. 3, 2018 (7 pages).

(Continued)

*Primary Examiner* — Tom P Duong
(74) *Attorney, Agent, or Firm* — Kagan Binder, PLLC

(57) ABSTRACT

Provided is a catalytic converter (1) for cleaning exhaust gases in pre catalytic converter vehicles. The catalytic converter (1) comprises a body of an elongated shape having a first end portion (11) and a second end portion (12). The first end portion (11) comprises an exhaust inlet (110) through which exhaust gases from the engine enters and the second end portion (12) comprises an exhaust outlet (120) through which the treated gases exit. The body has an internal space (14), wherein the internal space (14) at least partially comprises a plurality elongated passages (140) which are in fluid communication with said exhaust inlet (110) and exhaust outlet (120), the passages (14) being arranged at a density of 100-200 cells per square inch (cpsi).

16 Claims, 4 Drawing Sheets

(56) References Cited

U.S. PATENT DOCUMENTS

2012/0073270 A1\* 3/2012 Cox ........................ F01N 3/025
                                                            60/287

FOREIGN PATENT DOCUMENTS

| | | |
|---|---|---|
| JP | 2010096158 A | 4/2010 |
| WO | 2006100003 A1 | 9/2009 |

OTHER PUBLICATIONS

E-Space abstract of FR 2460709.
E-Space abstract of WO 2006100003.
E-Space abstract of JP 2010096158.

\* cited by examiner

CATALYTIC CONVERTER FOR CLASSIC CARS

CROSS-REFERENCE TO RELATED APPLICATIONS

This application claims priority to European Application No. 18151654.3, filed Jan. 15, 2018 and titled "CATALYTIC CONVERTER FOR CLASSIC CARS," which is incorporated herein by reference in its entirety.

TECHNICAL FIELD

The present disclosure relates to a catalytic converter, and especially a catalytic converter for the classic car market.

BACKGROUND

Modern cars have catalytic converters to remove particles and dangerous emissions from the exhaust gas. Since the introduction of catalytic converters in cars, the surrounding air has improved for both the environment and human beings since the overall CO2 emissions, NOX emissions and particulates have decreased, and since the 1980's, catalytic converters are, in several countries, mandatory in new cars. However, in old cars from the 70's and older, also called classic cars, primarily with old petrol engines such as carburetor engines and occasionally older fuel injected engines, this requirement is void, and there has been little or no development in finding a solution to easily adapt the classic cars to an up-to-date standard when it comes to the emission rates of toxic exhaust gases. Present solutions involve changing engines to more modern fuel injection engines in order to work, which is very costly. Also, many classic car enthusiasts are reluctant to make bigger changes to their cars. This is a problem since the number of cars without any emission control are staggering, and the smell and health problems relating to emissions are serious. Especially in urban areas where the smog builds up. Therefore, there is a clear gap in the market for any solution that may provide a better air environment in and around classic cars without catalytic converters.

SUMMARY

It is an object of the present invention to provide a catalytic converter which alleviates the drawbacks of present solutions and fills a gap in today's market. It is further an object to provide a catalytic converter which can be retrofitted on current classical cars with old petrol engines that originally was designed without catalytic converters, and without any other changes being made to them, such as changing engines to more modern systems.

Considering the environmental issues and potential health problems relating to emissions from cars, the need for a development in the classic car field is of great need. The problem has been that the classic car market has been, and still is, exempt from any requirements relating to emission control. This has allowed millions of old cars, especially cars from the 1970's and older, pollute the air with high levels of harmful exhaust gases. There are however luckily a number of car enthusiasts that would like to continue owning and driving the cars, but that would prefer a more environmental friendly approach to the driving, and avoiding the heavy smell that comes with the pollutions.

Modern catalytic converters used on modern engines are commonly ceramic with 400-600 cpsi (cells per square inch). Those are not made for old petrol engines, since the older engines emit a higher amount of pollutants and may block the cells in the converter if they are too narrow. Hence they are not suitable for older engines and do not work with engines which emit a high level of pollutants. The old petrol engines that were made in the pre catalytic converter era was primarily carburetor engines. There are also a small number of cars equipped with fuel injected engines during the same time. However, regardless of the type, the emissions from those engines are much higher than from today's modern engines.

Hence a catalytic converter designed to be retrofitted to pre catalytic converter vehicles with petrol engines, such as carburetor engines, were on the agenda. Also, since some older classic cars were made with fuel injected engines, but built without any emission reduction system, the catalytic converter may also be used on those engines.

A catalytic converter commonly consists of a vessel containing a matrix of passages. The passages may be formed and surrounded by a material with a specific material composition. The matrix, often a substrate rolled or formed to form a plurality of passages, also called cells commonly in a honeycomb structure or the like, may be ceramic or metallic. The material composition may comprise precious metals. The specific formulation of the precious metals may be designed to allow a chemical reaction to occur between the substrate and the gas that enters the converter. The resulting gas becomes less harmful, and thus the converter helps cleaning the passing exhaust gas. The untreated exhaust air that comes from the engine contains harmful gases and the catalytic converter is designed to convert the exhaust gases into more inert gases, such as N, $CO_2$ and water vapor. The structure of the cells may be designed to maximize the surface area of the catalytic material composition, and subsequently allow more exhaust gas to be put in contact with the catalytic composition in order to increase efficiency. The material composition with the formulation of precious metals and/or oxides inside the catalytic converter affects the efficiency of the cleaning, and also at what temperatures the catalytic converter is most efficient. Commonly, a catalytic converter must heat up to above 400° C. in order to work. This is because the precious metals only help oxidation of gases at that temperature.

Considering all the variable parameters such as cells per square inch, composition of metals, surface area and so on, designing a catalytic converter which may be efficient for cars with such high pollution rates, as well as to be effective on old engines, requires deep knowledge of catalytic converters and inventiveness.

As a new catalytic converter was under development, the inventors' testing on the number of cells per square inch was commenced. Because of earlier testing, the experience was that a modern catalytic converter with a cell density of standard 400-600 cpsi was not efficient and stopped working. The modern standard catalytic converters are not designed for old petrol engines since those types of engines produce a very high amount of pollutants.

An aspect of the present invention is to provide a catalytic converter for cleaning exhaust gases in pre catalytic converter vehicles. The catalytic converter comprises a body of an elongated shape having a first end portion and a second end portion. The first end portion comprises an exhaust inlet through which exhaust gases from the engine enters and the second end portion comprises an exhaust outlet through which the treated gases exit. The body has an internal space. The internal space at least partially comprises a plurality of elongated passages treated with at least one catalytic compound and are in fluid communication with the exhaust inlet and exhaust outlet. The passages are arranged at a density of 100-200 cells per square inch (cpsi).

This arrangement has been thoroughly tested with great results on a carburetor engine. Vehicles of that type were manufactured before catalytic converters existed, which means these engines do not have the necessary required equipment, such as ECU, LAMBDA SENSOR, AIRFLOW MASS SENSORs etc. to run catalytic converters which were introduced on the market during later years. Therefore, there was a challenge in finding a single device converter which could be used directly on the exhaust system, as is.

Much to the inventors' surprise, the most efficient catalytic converter had a relatively low cell density within the mentioned interval. During the testing it became clear that a high cell density caused the converter to block itself due to the build-up of emissions and particulates inside the converter. A higher cell density may thus not provide the same result because at engine idle speed the modern converter may not cope with the heavier exhaust emissions coming from a carburetor engine. The less number of cells in the mentioned interval thus means that the cells are bigger and may allow a calmer flow of gas through them. This may also allow a higher amount of polluted gas to be treated at one time and thus a highly polluted gas from for instance a carburetor engine may be treated more efficiently than if the cell density would be big. Neither did a lower cell density provide an efficient result, possibly due to the smaller surface area of the precious metal composition.

In one embodiment, the passages may be formed in a matrix of cells. The matrix may be formed by a matrix material comprising said catalytic compound, wherein the catalytic compound comprises a precious metal content at least comprising Rhodium. Rhodium may have the ability to remove nitrous oxide gases (NOX), such as NO and NO2 and convert them into Nitrogen and water. Since the exhaust emissions from old carburetor engines are very high on NOX, Rhodium may be a desired substance in the cell structure. The high amount of NOX in the exhaust gases also may contribute to a heavy exhaust smell. Therefore, the Rhodium may be highly efficient in removing the smell from the exhaust gas. This is an advantage since the air inside and around the classic cars becomes easier to breathe and much less harmful. Combined with the unique formulation of the alloy of precious metals used, the particular cell density showed a high efficiency of removing emission gases.

In one embodiment, the catalytic compound may further comprise Palladium. Palladium may be an efficient oxidizer of exhaust gases. This means that once the converter has heated up, the exhaust gases along with oxygen in the air reacts with the palladium to break the bonds in the NOX to create N and $H_2O$.

In one embodiment, the catalytic compound may further comprise Platinum.

In one embodiment, the precious metal ratio of Pt:Pd:Rh may be 1:5:1. In one embodiment the precious metal amount may be 40-60 grams, preferably 45-55 grams, and more preferably 55 grams. Initial emission tests showed that NOX levels in carburetor engines may be very high relative to modern engines. The NOX levels on the tested vehicle, which is a common old 1970 classic car, could be more than 40 times higher than on a modern Euro 6 engine. During testing, it became apparent that this ratio of precious metals provided the greatest reduction of exhaust emissions HC, CO2, and NOX for carburetor engines. This ratio contributed to a reduction of up to 79% of NOX exhaust emissions over all.

In one embodiment, the cell density is 120-160 cpsi.

In one embodiment, the cell density is about 150 cpsi. As mentioned previously, a high cell density may cause the converter to block itself since the passages become too narrow. Therefore, a cell density which may be less, but instead may provide a high surface area of the passage as well as a smooth passage for the exhaust air could be established to around 150 cpsi. This specific cell density contributed to a reduction of 79% of harmful NOX emissions over all.

In one embodiment, the cell matrix may be formed from corrugated sheet metal foil. The cell matrix may be formed from corrugated steel foil which may be layered with a smooth steel foil and spiraled or folded into a matrix of passages. The foil may be a stainless steel foil with a thickness of about 0.05-0.1 mm, preferably a thickness of 0.08 mm. The stainless steel foil may be coated with the precious metal composition which constitutes the catalytic compound.

In one embodiment the operating temperature of the catalytic converter is at least 280° C. The precious metals may need a certain temperature in order to work. In this case, the catalytic converter may need at least 280° C. in order to activate the precious metals. Lower temperatures may provide low efficiency. Therefore, it is important to arrange the catalytic converter fairly close to the engine so that the gases allow to heat the converter, and not cool down during transport in the exhaust pipe. The catalytic converter may be arranged within a meter of the engine.

In one embodiment the body comprises a cylindrical body. The first end portion may have a frustoconical form, and the second end portion may have a frustoconical form. The first end portion may have a base diameter-length ratio shorter than that of the second end portion. The conical shape may be critical to the carburetor engine BHP performance (Break Horse Powers). The testing revealed that with a conical shape of the inlet wherein the cone is short and steep on the inlet side, the engine may not show any significant loss to the BHP performance. This is a great advantage since any loss in BHP may cause a fading interest in fitting catalytic converters to a classic car. In general, people want as many horse powers as possible. Therefore, it may be very important that a retrofit catalytic converter provide high efficiency without any significant losses and disadvantages. The specific conical design of the converter may allow the exhaust gases to flow through the converter without any backpressure build up. During testing, it was revealed that a carburetor engine is much more sensitive to exhaust gas back pressures compared to a modern fuel injected engine. The reason for this may be that modern engines produce much more horse power/torque compared to a carburetor engine that is within the same size engine capacity. Thus, if a standard converter would be fitted to a carburetor engine the engine performance may drop by a significant amount. Subsequently, a standard converter may create too much back pressure for a carburetor engine to operate correctly. The short cone on the first end portion may allow the exhaust gases to be distributed faster and more evenly within the converter. The long cone may help the exhaust gas exit the converter quickly. Thus, the short cone design of the first end portion combined with the 150 cpsi metal cell structure allow a beneficial balance of performance level with a result of plus/minus 1 BHP difference.

To summarize, a carburetor engine normally may contribute to a high backpressure. That is one significant reason as to why modern catalytic converters for fuel injection engines do not work with carburetor engines. Thus, it is a great advantage with a converter design that prevents the backpressure buildup, since this also means that the engine performance may be the same when the converter is retro fitted to a vehicle. This is a further advantage since a retro fitted catalytic converter with no other requirements to change the engine or the exhaust system may be more likely to be used, since it is a cheap way to make the vehicle more environmentally friendly to drive, with substantially no disadvantages. Tests using the converter with this specific shape was done on vehicles with engines ranging from 1.8 liters to 5.8 liters, and the performance results was the same for all tested vehicles.

In one embodiment, the first end portion may have a base radius-cone height ratio of 7:4. This means that if the radius is 7, the length is only 4. In other words, the angle of the cone may be between 55-62 degrees. Preferably around 59 degrees. This is because a steep angle introduces the gas quickly in the converter 1, which is an advantage since it may prevent backpressure buildup. The second end portion may have a base radius-cone height ratio of 7:26. In other words, the angle of the cone may be between 12 and 16 degrees. Preferably around 14-14.5 degrees. This is because a longer cone allows the gas to leave the converter 1 in a quick and steady flow.

Having these ratios in mind, it may be possible to scale the catalytic converter to a smaller or bigger size. For instance, on a vehicle that has dual exhaust pipes, a smaller catalytic converter or several catalytic converters may be needed because of the space available.

There is a second aspect to provide an exhaust system comprising at least one catalytic converter according to the invention. The car using the exhaust system may of the kind may be any car, such as a carburetor engine petrol car. It should however be clarified that the converter may be designed to be retro fitted to all pre catalytic converter vehicles with carburetor or fuel injected petrol engines. The converter is designed for pre catalytic converter petrol engine vehicles.

In one embodiment the exhaust system is a dual piped exhaust gas system, further comprising, on each of the exhaust pipes one catalytic converter according to an embodiment. The catalytic converter may thus be suitable on exhaust systems having multiple pipes.

There is a third aspect to provide a car comprising a catalytic converter according to the invention.

In one embodiment, the car is equipped with an engine which may be a carburetor engine.

In one embodiment, the car may be equipped with an exhaust system according to the invention.

BRIEF DESCRIPTION OF THE DRAWINGS

The invention will in the following be described in more detail with reference to the enclosed drawings, wherein.

DETAILED DESCRIPTION OF EMBODIMENTS

Figure 1:
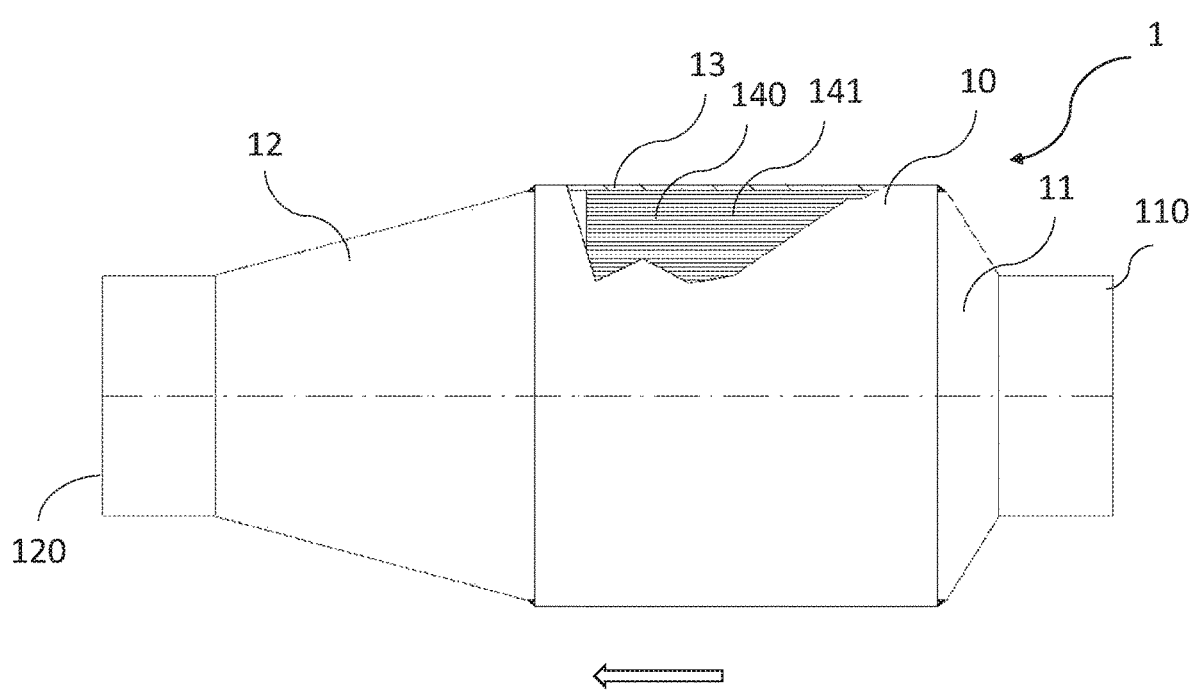
FIG. 1 is a top view of a catalytic converter according to an embodiment of the invention.

The present invention will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements.

FIG. 1 illustrates a top view of a catalytic converter 1 according to an embodiment. The catalytic converter is specifically adapted to be effective on petrol carburetor engines. Especially the type of engines that are common in so called classic cars. The catalytic converter 1 has a circular cylindrical body 10. At each end of the cylindrical body there is a first end portion 11 and a second end portion 12. The first end portion 11 comprises an exhaust inlet 110 through which exhaust gases enter from an engine of the vehicle (not shown) into the catalytic converter 1. The first end portion 11 is thus adapted to be arranged towards the engine. The second end portion 12 comprises an exhaust outlet 120 through which treated exhaust gases exit the catalytic converter 1. The arrow shows the gas flow of the system. The body 10 is surrounded by a shell 13, in this embodiment made from a sheet metal. The sheet metal is a steel foil having a thickness of around 1.5 mm, but any thickness suitable may be used. Inside the body 10 there is an internal space 14. The internal space 14 comprises a plurality off passages 140 through which the exhaust gas flows. The passages 140 extends longitudinally from the first end portion 11 to the second end portion 12. In FIG. 1, the passages 140 are schematically indicated. The passages 140 are arranged in a matrix of cells 141. The matrix of cells is measured in a unit of cells per square inch, and is thus the number of passages per area unit as seen in the flow direction of the gas. In this particular catalytic converter, the cpsi is around 150. The passages 140 are formed from a metal foil coated with an active catalytic compound. The metal foil may be a steel foil and the coating may be adapted to be effective on the specific exhaust gas. In this particular embodiment, the exhaust gases from petrol carburetor engines are very high on pollutants. Therefore, this specific compound comprises the precious metals Platinum, Palladium and Rhodium. The first end portion 11 has a frustoconical shape. The cone is short, i.e., the base radius-cone height ratio is about 7:4. That is the relation between the base radius and the cone height is about 7:4. In other words, the angle of the cone may be between 55-62 degrees. Preferably around 59 degrees. This is because a steep angle introduces the gas quickly in the converter 1, which is an advantage since it may prevent backpressure buildup. The second end portion has a frustoconical shape. The cone is longer than that of the first end portion 11, i.e., the base radius-cone height ratio is about 7:26. That is, the relation between the base radius and the cone height is about 7:26. In other words, the angle of the cone may be between 12 and 16 degrees. Preferably around 14-14.5 degrees. This is because a longer cone allows the gas to leave the converter 1 in a quick and steady flow. The exhaust inlet 110 and the exhaust outlet 120 are adapted to be fitted on pipes used in an exhaust gas system. Therefore, the inlet and outlet have a smaller diameter connection.

Figure 2:
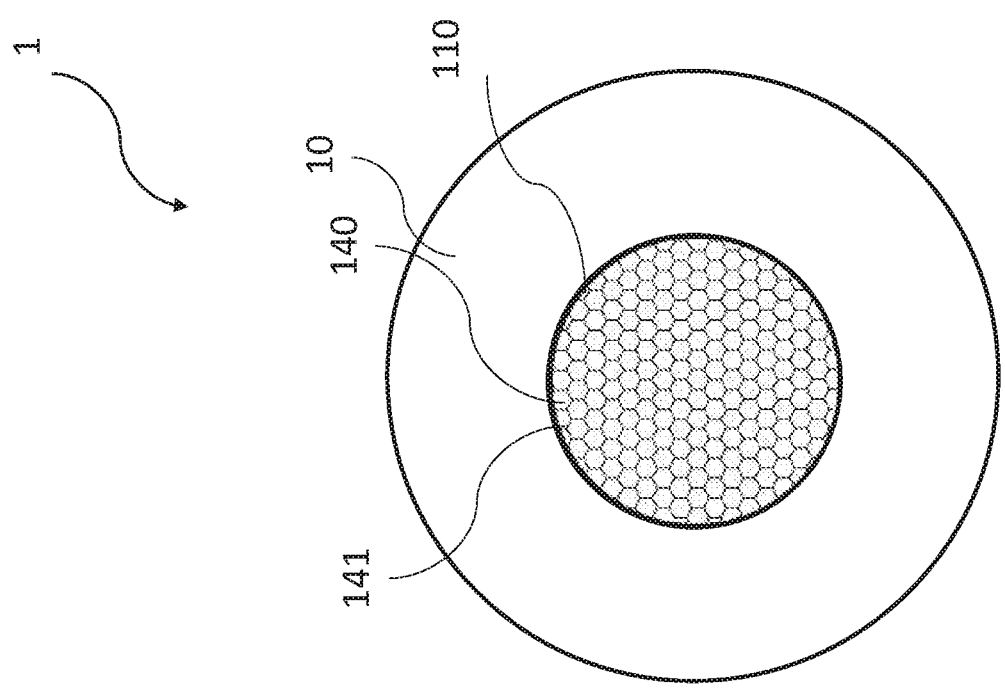
FIG. 2 is a schematic side view of a catalytic converter according to an embodiment of the invention.

FIG. 2 is a schematic side view of a catalytic converter 1. Inside the catalytic converter 1 there are a large number of cells 141. The cells 141 are only schematically shown and may be any suitable shape depending on way of production. The exhaust gas enters through the inlet 110 and transports through the cells 141 to the outlet (not shown).

Figure 3:
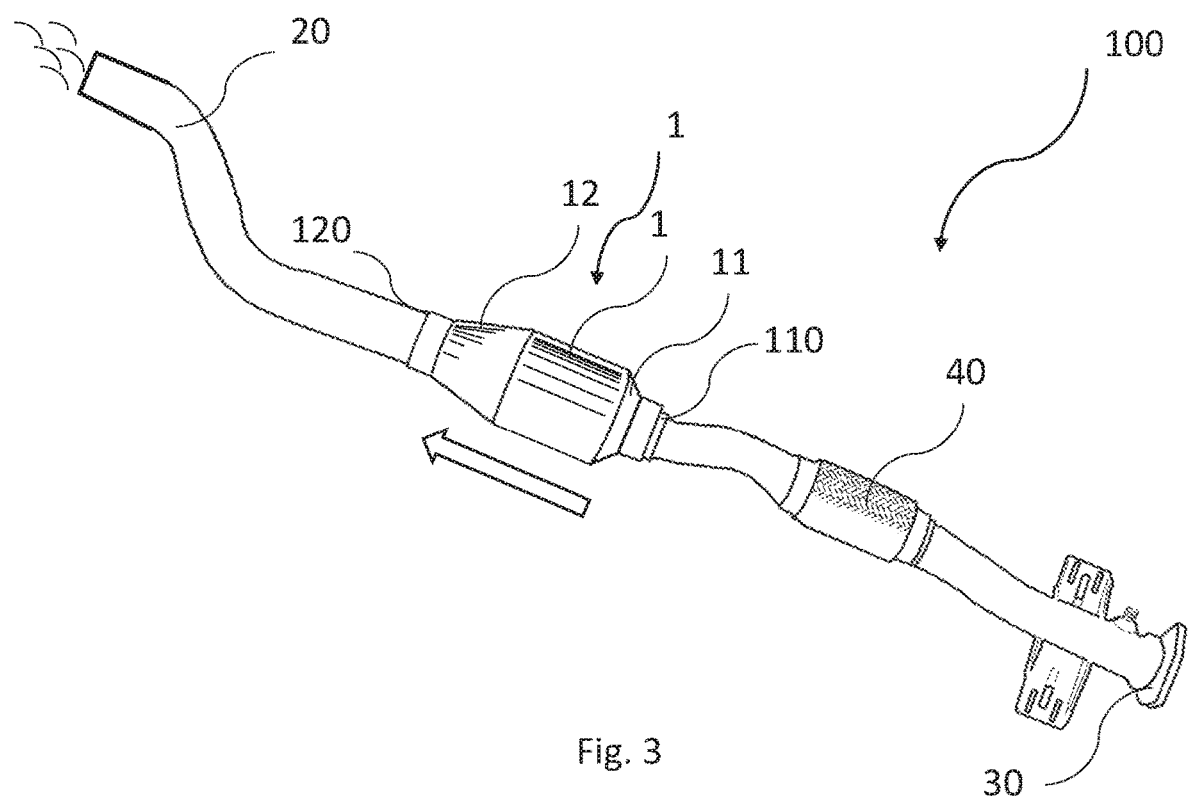
FIG. 3 is an assembly of a catalytic converter system using a catalytic converter according to an embodiment of the invention.

FIG. 3 illustrates a common exhaust system 100 on a vehicle. The catalytic converter 1 is arranged between a manifold connection 30 to which manifolds of the engine (not shown) normally is arranged. There is a flex pipe 40. The catalytic converter 1 is arranged along the system 100 by the first end portion 11 towards the engine side. The catalytic converter 1 is preferably arranged close to the engine in order to heat up and activate the catalytic precious metals. The catalytic converter is thus preferably arranged within a meter from the engine. The second end portion of the catalytic converter is arranged towards a tail pipe 20 of the exhaust system. The second end portion is thus adapted to be arranged towards the tail pipe of the vehicle, through which the exhaust gases leave the exhaust system 100 to ambient air.

Figure 4:
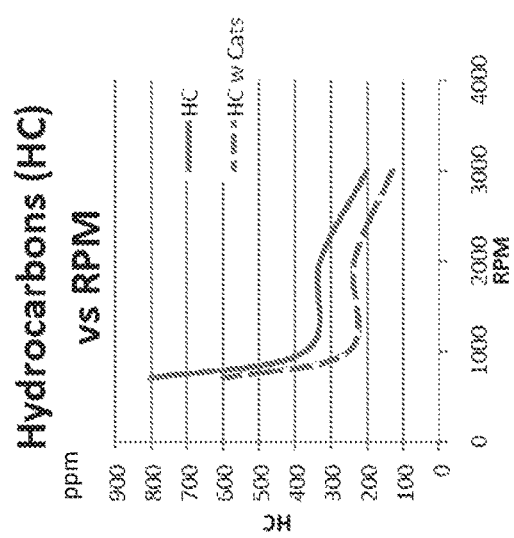
FIG. 4 is a graph showing emissions of Hydrocarbons on a vehicle fitted with and without a catalytic converter according to an embodiment of the invention.
Figure 5:
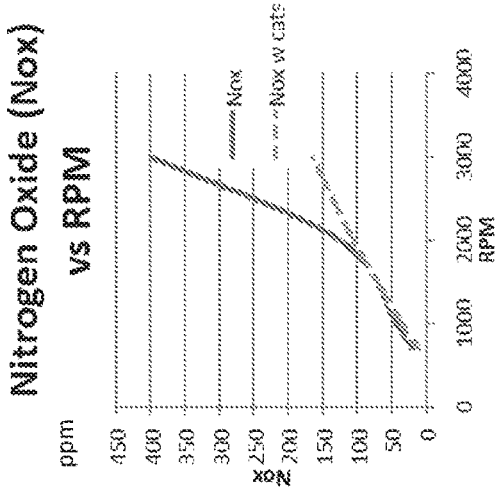
FIG. 5 is a graph showing emissions of NOX on a vehicle fitted with and without a catalytic converter according to an embodiment of the invention.

FIGS. 4 and 5 shows graphs of test results measuring the emitted hydrocarbons and NOX on a vehicle with and without a catalytic converter according to the invention. The vehicle on this particular test was a 1970 Ford mustang with a 5.8 l V8 engine. In FIG. 4 it is shown that the amount of hydrocarbons naturally decreases with a higher RPM but it can be seen that the emitted hydrocarbons are reduced by 25-40% by using the catalytic converter 1 according to the invention.

FIG. 5 shows the NOX reduction by using the catalytic converter 1 according to the invention. It can be seen that for low RPM:s, the NOX levels are fairly similar using the catalytic converter or not. However, at around 1700 RPM, the amount of emitted NOX starts to increase by a factor of 4 to 400 ppm at 3000 RPM when the vehicle is not equipped with the catalytic converter. When the vehicle is equipped with the catalytic converter, the amount of NOX increases by a factor of 1.6 at a steady pace up to a max of 160 ppm at 3000 RPM. This shows that a vehicle equipped with the catalytic converter 1 according to the invention, emits only 40% of the NOX emitted in a vehicle which is not equipped with the catalytic converter.

In the drawings and specification, there have been disclosed preferred embodiments and examples of the invention and, although specific terms are employed, they are used in a generic and descriptive sense only and not for the purpose of limitation, the scope of the invention being set forth in the following claims.

The invention claimed is:

1. A catalytic converter for cleaning exhaust gases in pre catalytic converter vehicles, said catalytic converter comprising:
a body of an elongated shape having a first end portion and a second end portion, wherein the first end portion comprises an exhaust inlet through which exhaust gases from the engine enters and the second end portion comprises an exhaust outlet through which the treated gases exit,
the body having an internal space, wherein the internal space at least partially comprises a plurality of elongated passages treated with at least one catalytic compound and which are in fluid communication with said exhaust inlet and exhaust outlet,
the passages being arranged at a density of 100-200 cells per square inch, and
wherein the body has a cylindrical shape, and wherein the first end portion has a frustoconical form, and the second end portion has a frustoconical form, and
wherein the first end portion has a base radius-length ratio shorter than that of the second end portion.

2. The catalytic converter according to claim 1, in which the operating temperature of the catalytic converter is at least 280° C.

3. The catalytic converter according to claim 1, wherein the cell matrix is formed by corrugated sheet metal foil.

4. The catalytic converter according to claim 1, wherein the first end portion has a base radius-cone height ratio such that the angle of the cone is from about 55 degrees to about 62 degrees, and the second end portion has a base radius-cone height ratio such that the angle of the cone is from about 12 degrees to about 16 degrees.

5. The catalytic converter according to claim 4, wherein the first end portion has a radius-cone height ratio such that the angle of the cone is from about 59 degrees, and the second end portion has a base radius-cone height ratio such that the angle of the cone is from about 14 degrees to about 14.5 degrees.

6. The catalytic converter according to claim 1, wherein the cell density is 120-160 cells per square inch.

7. The catalytic converter according to claim 1, wherein the cell density is about 150 cpsi.

8. The catalytic converter according to claim 1, wherein the catalytic compound comprises a precious metal content at least comprising Rhodium.

9. The catalytic converter according to claim 8, wherein the catalytic compound further comprises Palladium.

10. The catalytic converter according to claim 8, wherein the catalytic compound further comprises Platinum.

11. The catalytic converter according to claim 1, wherein the catalytic compound comprises a precious metal content at least comprising Rhodium, Palladium and Platinum, and the precious metal ratio of Pt:Pd:Rh is 1:5:1.

12. The catalytic converter according to claim 11, wherein the precious metal amount is from about 40 to about 60 grams.

13. The catalytic converter according to claim 11, wherein the precious metal amount is from about 45 to about 55 grams.

14. A method of retrofitting a pre-catalytic converter vehicle to reduce emissions comprising installing a catalytic converter configured according to claim 1 in a pre-catalytic convertor vehicle without changing the engine of the pre-catalytic converter vehicle from an engine that originally was designed without catalytic converters.

15. The catalytic converter according to claim 1, wherein the cell matrix is formed from a stainless steel foil.

16. The catalytic converter according to claim 1, wherein the cell matrix is formed from corrugated steel foil that is layered with a smooth steel foil and spiraled or folded into a matrix of passages.

* * * * *